United States Patent
Ward

(10) Patent No.: US 11,618,646 B2
(45) Date of Patent: Apr. 4, 2023

(54) METHOD FOR PRODUCING A MULTI-PURPOSE AGRICULTURAL, HORTICULTURAL AND FLORISTRY TIE

(71) Applicant: Nathan Ward, Seattle, WA (US)

(72) Inventor: Nathan Ward, Seattle, WA (US)

(73) Assignee: Nathan Ward, Seattle, WA (US)

( * ) Notice: Subject to any disclaimer, the term of this patent is extended or adjusted under 35 U.S.C. 154(b) by 744 days.

(21) Appl. No.: 16/659,694

(22) Filed: Oct. 22, 2019

(65) Prior Publication Data

US 2021/0114839 A1 Apr. 22, 2021

(51) Int. Cl.
| | |
|---|---|
| B65H 75/02 | (2006.01) |
| D07B 5/00 | (2006.01) |
| A01G 5/00 | (2006.01) |
| B65H 55/00 | (2006.01) |

(52) U.S. Cl.
CPC .............. *B65H 75/02* (2013.01); *D07B 5/00* (2013.01); *A01G 5/00* (2013.01); *D07B 2205/00* (2013.01)

(58) Field of Classification Search
CPC .......... D07B 5/00; B65H 75/02; A01G 9/126; A01G 9/128; A01G 17/08; A01G 17/10; D02G 3/06
See application file for complete search history.

(56) References Cited

U.S. PATENT DOCUMENTS 6,122,859 A * 9/2000 Lazar ..................... A01G 9/128
47/44

FOREIGN PATENT DOCUMENTS

| GB | 2484912 A | * | 5/2012 | ............. D02G 3/16 |
| JP | 2001096288 A | * | 4/2001 | |
| JP | 6338146 B2 | * | 6/2018 | |
| KR | 20130137747 A | * | 12/2013 | ............. D07B 7/16 |
| KR | 20190001024 A | * | 4/2019 | ............. D07B 1/02 |
| TW | 584333 U | * | 10/2019 | |

OTHER PUBLICATIONS

Rebecca Bryan, How to Make Selvage Quilt Binding, with Rebecca Bryan; youtube.com video; https://www.youtube.com/watch?v=d3tzYZoCnag, accessed Jul. 19, 2022; published Nov. 9, 2018. (Year: 2018).*
Stitches n Scraps; website; https://stitchesnscraps.com/hanks-balls-and-skeins-oh-my/; accessed Jul. 20, 2022; published Jul. 16, 2015. (Year: 2015).*
Tuesday Stitches; website; https://tuesdaystitches.com/how-to-choose-swimsuit-fabric/; accessed Jul. 20, 2022; published Jul. 1, 2015. (Year: 2015).*
My Poppet Makers; Scrapbusting: How To Make Fabric Twine; https://mypoppet.com.au/makes/scrapbusting-handmade-scrap-fabric-twine/; accessed on Nov. 29, 2022; published Apr. 30, 2014. (Year: 2014).*
Let's Make Fabric Scrap Twine; youtube.com video; mypoppetblogs; https://www.youtube.com/watch?v=QyAUBuKifAc; accessed on Nov. 29, 2022; published May 7, 2019. (Year: 2019).*

* cited by examiner

*Primary Examiner* — Daniel J Colilla

(57) ABSTRACT

A method for producing a multi-purpose agricultural, horticultural and floristry tie includes collecting a plurality of textile selvages, sorting the plurality of textile selvages into desired groups according to predetermined criteria, forming a cord of specific, desired length by aggregating shorter or trimming longer lengths from the sorted plurality and winding the cord into a unit to be used as an agricultural, horticultural and floristry tie.

11 Claims, 1 Drawing Sheet

METHOD FOR PRODUCING A MULTI-PURPOSE AGRICULTURAL, HORTICULTURAL AND FLORISTRY TIE

BACKGROUND

1. Field of the Invention

The present invention relates generally to agricultural, horticultural and floristry ties, and more specifically, to a method for producing a multi-purpose tie from textile fabric for use in agriculture, horticulture, and floristry.

2. Description of Related Art

Tie, or cord, is used in agriculture, horticulture and floristry as a necessary tool for a variety of purposes, including trellising and training plants, marking plants and rows of plants, cordoning, and binding plants and flowers together. Historically, various tying mechanisms such as twines, strings, rubber bands, plastic tubes and tapes, metal clips and small pieces of cut-up rags have been used to achieve these purposes. However, such existing tying mechanisms have specific limitations. Twine, strings, rubber bands, rigid plastic and metal are restrictive and girdle or choke a plant as it grows, injuring or killing it. Flexible plastic lacks strength and is prone to breakage. Plastics are also prone to weakening and degradation from UV light. Metal freezes and rusts. Rags are work-intensive, haphazard, non-standard and inefficient. Rubber bands, metal clips and hard plastics are also produced in restrictive sizes. The production of these other tying methods increases waste and introduces more plastics and one-time use products into the environment, as well as byproducts from their manufacture.

Accordingly, although great strides have been made in the area of agricultural, horticultural and floristry ties, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
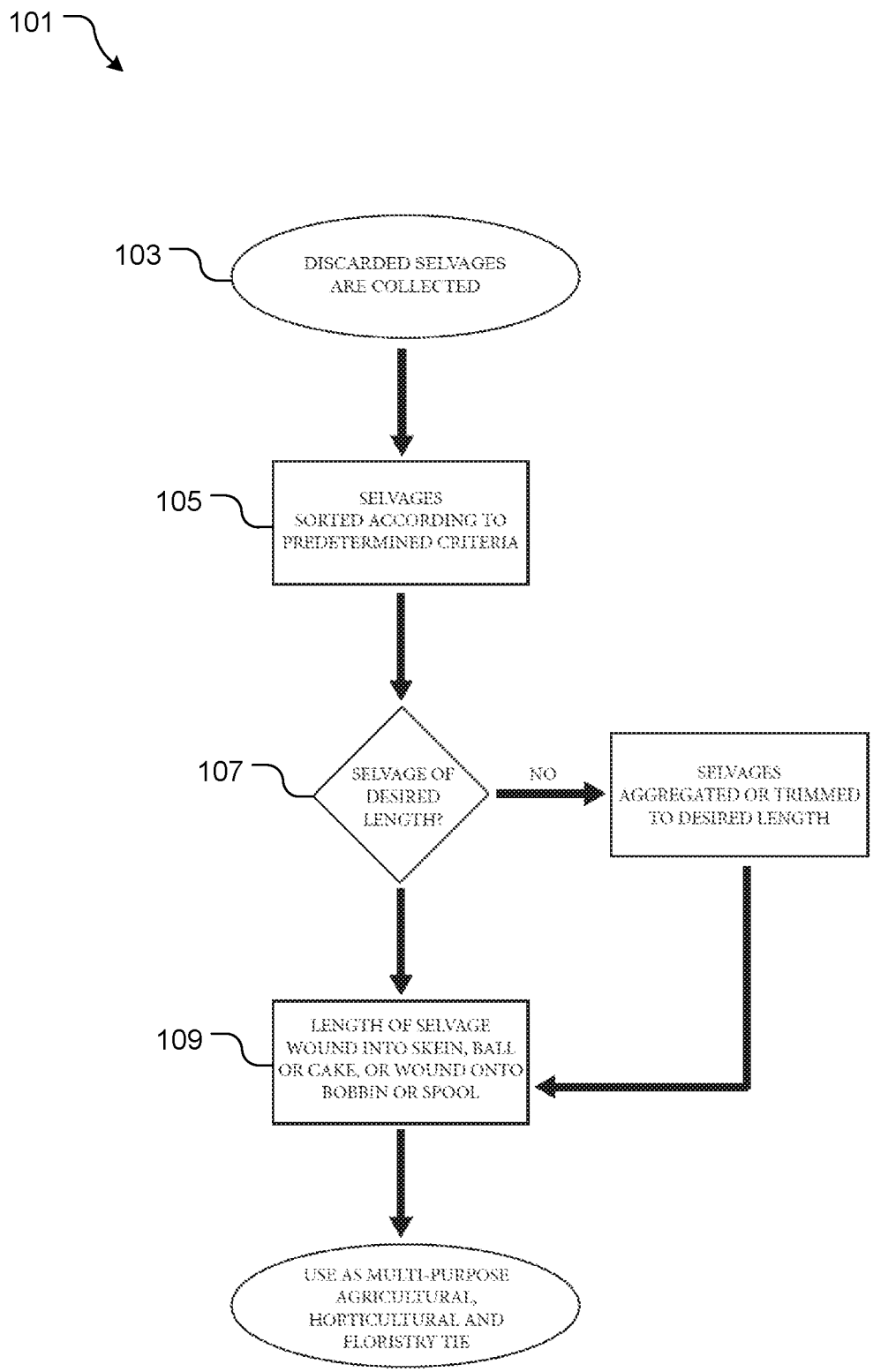
FIG. 1 is a flowchart of a method for producing a multi-purpose agricultural, horticultural and floristry tie in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional agricultural ties. Specifically, waste reduction and increased performance. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

The selvages of textiles are the structurally sound edges of the fabric running parallel to the lengthwise wale (knitted textiles) or warp (woven textiles) of the fabric. Selvages can be identified by specific characteristics. Selvages can contain cosmetically or structurally different elements than the main width of the textile. The selvages of woven fabrics are tightly woven and can pucker when cut from the main width. Selvages from knitted fabrics curl upon themselves towards the purl side of the knitted stitch. Both woven and knitted textiles can contain pinpoint holes running their length where the fabric was attached to the loom or knitting machine.

To achieve consistency in the stretch, material construction and cosmetic appearance of the end garment or textile product, the selvage is not utilized. The selvages are cut-off from both ends of the manufactured run and discarded. This discarded selvage is a long, narrow strip of fabric that is cord-like in both appearance and function.

The use of fabric selvage as a tying mechanism in agriculture, horticulture and floristry has multiple benefits that overcome the limitations and inefficiencies of other tying mechanisms.

Because the selvage runs lengthwise along the material, it can be as long as the entire manufactured run of the material. Long cords can be wound onto a spool or bobbin, or into a unit such as a skein, ball or cake for standard, efficient utilization. In addition, cords may be aggregated with a small knot or stitch, or, conversely, trimmed, to create cords of specific, desired lengths without compromise to the structural or functional integrity of the cord. This decreases restrictions as to how the tie can be utilized.

Textiles, by the nature of their construction, embody some elasticity. The type of textile (knit or weave) offers different levels of mechanical stretch. In addition, specific elastomeric fibers (such as elastane) used to weave or knit the textile can increase the amount of stretch in the finished material. This stretch is present in the selvages as well as the main width of the textile. When used as a tying mechanism, the inherent elasticity from construction and enhanced stretch from elastomeric fibers works to severely limit choking/girdling and subsequent injury to the plant as it grows. The selvage is structurally able to stretch with the expanding plant. This results in healthier plants as well as less waste, as plants do not need to be re-tied as they grow. In addition, this stretch protects the ends of cut plants and flowers from damage while maintaining the tight bundles required for efficient transport and sale.

Selvages are made from various natural and synthetic fibers and are essentially "weatherproof". The rate at which selvages can degrade or become structurally compromised due to exposure to sunlight, heat, cold and moisture is very slow. This resistance also allows them to be reused—a length of selvage tying a plant can be untied and reused on another plant.

Selvage is plentiful and regular, as garment cut and sew operations are continually discarding it. Reusing the discarded selvages as tie, or cord, in agricultural, horticultural and floristry applications is sustainable, reduces waste and is highly efficient. No byproducts are created in the preparation of, or use of selvage as a tying mechanism.

Referring now to the drawings wherein like reference characters identify corresponding or similar elements throughout the several views, FIG. 1 depicts a flowchart of a method for producing a multi-purpose agricultural, horticultural and floristry tie in accordance with a preferred embodiment of the present application. It will be appreciated that method 101 overcomes one or more of the above-listed problems commonly associated with conventional agricultural ties.

In the contemplated embodiment, method 101 includes the steps of collecting a plurality of discarded textile selvages in step 103, sorting the plurality of textile selvages into desired groups according to predetermined criteria in step 105, forming a cord of desired length by aggregating shorter or trimming longer lengths from the sorted plurality in step 107 and winding the cord into a unit for use as an agricultural, horticultural and floristry tie in step 109.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for producing a multi-purpose agricultural, horticultural and floristry tie, the method comprising:
    collecting a plurality of textile selvages, each selvage in the plurality of textile selvages having a width and having a length that is larger than the width;
    sorting the plurality of textile selvages according to predetermined criteria;
    attaching, along their respective widths, two or more sorted textile selvages of the plurality of textile selvages to form a cord of at least a desired length, wherein at least one of the two or more sorted textile selvages comprises elastomeric fibers; and
    winding the cord into a unit.

2. The method for producing a multi-purpose agricultural, horticultural and floristry tie of claim 1, wherein the plurality of textile selvages includes recycled material.

3. The method for producing a multi-purpose agricultural, horticultural and floristry tie of claim 1, wherein the plurality of textile selvages includes waste material.

4. The method for producing a multi-purpose agricultural, horticultural and floristry tie of claim 1, wherein at least one selvage in the plurality of textile selvages further comprises natural fibers.

5. The method for producing a multi-purpose agricultural, horticultural and floristry tie of claim 1, wherein the plurality of textile selvages is wound around a spool or bobbin.

6. The method for producing a multi-purpose agricultural, horticultural and floristry tie of claim 1, wherein the plurality of textile selvages is wound into a skein.

7. The method for producing a multi-purpose agricultural, horticultural and floristry tie of claim 1, wherein the plurality of textile selvages is wound into a cake.

8. The method for producing a multi-purpose agricultural, horticultural and floristry tie of claim 1, wherein the plurality of textile selvages is wound into a ball.

9. The method for producing a multi-purpose agricultural, horticultural and floristry tie of claim 1, wherein attaching comprises tying a knot.

10. The method for producing a multi-purpose agricultural, horticultural and floristry tie of claim 1, wherein attaching comprises stitching.

11. The method for producing a multi-purpose agricultural, horticultural and floristry tie of claim 1, further comprising trimming one or more of the sorted textile selvages so that the cord has the desired length.

* * * * *